United States Patent
Vora (10) Patent No.: US 12,361,155 B2
(45) Date of Patent: Jul. 15, 2025

(54) SYSTEMS AND METHODS FOR CONTROLLING PERMISSIONS IN BLOCKCHAINS

(71) Applicant: Capital One Services, LLC, McLean, VA (US)

(72) Inventor: Mihir Vora, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 320 days.

(21) Appl. No.: 18/046,783

(22) Filed: Oct. 14, 2022

(65) Prior Publication Data
US 2024/0126911 A1    Apr. 18, 2024

(51) Int. Cl.
G06F 21/62    (2013.01)
H04L 9/00    (2022.01)

(52) U.S. Cl.
CPC ............ *G06F 21/6227* (2013.01); *H04L 9/50* (2022.05)

(58) Field of Classification Search
CPC ............................... G06F 21/6227; H04L 9/50
USPC .......................................................... 713/189
See application file for complete search history.

(56) References Cited

U.S. PATENT DOCUMENTS

| | | | |
|---|---|---|---|
| 11,216,773 B1* | 1/2022 | Griggs | G06Q 10/0833 |
| 2019/0004789 A1* | 1/2019 | Mills | H04L 9/3239 |
| 2019/0081796 A1* | 3/2019 | Chow | G06Q 20/34 |
| 2019/0238550 A1* | 8/2019 | Zhang | H04L 63/105 |
| 2020/0184162 A1* | 6/2020 | Levy | G06Q 30/0609 |
| 2020/0358812 A1* | 11/2020 | Xiao | H04L 63/1441 |
| 2021/0004297 A1* | 1/2021 | Scrivner | G06F 11/1451 |
| 2021/0304216 A1* | 9/2021 | King | G06Q 10/10 |
| 2021/0409489 A1* | 12/2021 | Speasl | H04L 63/123 |
| 2022/0058284 A1* | 2/2022 | Moore | H04L 9/0643 |
| 2024/0095475 A1* | 3/2024 | Bevan | H04L 9/50 |

\* cited by examiner

*Primary Examiner* — David P Zarka
(74) *Attorney, Agent, or Firm* — Foley & Lardner LLP (57) ABSTRACT

Methods and systems for controlling users' access to data available on blockchains are described herein, comprising: determining a first right for a first user to first data; determining a location in a permissioned blockchain comprising the first data, the location being a first fork of the permissioned blockchain; determining a first privilege required to access the first fork; determining that the first user corresponds to a first cryptographic address; and assigning the first privilege to the first cryptographic address.

19 Claims, 4 Drawing Sheets

SYSTEMS AND METHODS FOR CONTROLLING PERMISSIONS IN BLOCKCHAINS

BACKGROUND

In recent years, the use of blockchain technology for various applications, including, but not limited to, smart contracts, non-fungible tokens, cryptocurrency, smart finance, blockchain-based data storage, etc. (referred to collectively herein as blockchain applications) has exponentially increased. Each of these applications benefits from blockchain technology that allows for the recording of information that is difficult or impossible to change (either in authorized or unauthorized manner). For example, a blockchain is essentially a digital ledger of transactions that is duplicated and distributed across the entire network of computer systems on the blockchain. That is, the digital ledger of a blockchain is a decentralized source of information that does not require a central authority to monitor transactions, maintain records, and/or enforce rules. Instead, technology underlying the blockchain network, namely cryptography techniques (e.g., secret-key, public key, and/or hash functions), consensus mechanisms (e.g., Proof of Work ("POW"), Proof of Stake ("POS"), Delegated Proof of Stake ("dPOS"), Practical Byzantine Fault Tolerance ("pBFT"), Proof of Elapsed Time Broadly ("PoET"), etc.), and computer networks (e.g., peer-to-peer ("P2P"), the Internet, etc.) combine to provide an decentralized environment that enables the technical benefits of blockchain technology.

However, despite these benefits and despite the wide-ranging number of potential applications, practical implementations of blockchain technology have been hindered by several technical problems. First, blockchain technology often relies on large amounts of energy and dedicated resources to ensure that consensus mechanisms (e.g., POW) run. Second, despite the mainstream popularity of blockchain technology, practical implementations of blockchain technology require specialized knowledge to design, program, and integrate blockchain technology-based solutions, which limits the amount of people and resources available to create these practical implementations. Third, blockchain technology, despite its decentralized nature, faces scalability issues and/or low transaction speeds when attempting to accommodate a large number of users at a given time. Finally, depending on the application and the intent of the users, the key benefits of blockchain technology such as a public ledger, use of digital wallets, and immutable transactions, may be seen negatively by users that wish to maintain privacy of transactions, wish to know the true identities of users involved in transactions, and with to reverse unauthorized transactions, respectively. These technical problems present an inherent problem with attempting to use a blockchain technology-based solution facilitating exchange of sensitive information between users into a permissioned blockchain ecosystem where updates can be posted to blocks viewable by relevant parties.

SUMMARY

Methods and systems are described herein for novel uses and/or improvements to blockchain technology. As one example, methods and systems are described herein for controlling permissioned access to data within a permissioned blockchain.

Existing blockchain systems would reveal all data residing in the blockchain to all parties. For example, existing systems do not distinguish between levels of participation for parties on a blockchain and simply expose all data on the blockchain to all users of the blockchain. The inability to perform this distinction and limit the accessibility of blockchain data creates hurdles to adopting blockchain technology for practical application which require such functionality. However, implementing this functionality faces several technical challenges such as the lack of an established permission hierarchy and a lack of segmentation for blockchain blocks such that only certain users can view the blocks.

To overcome these technical deficiencies in adapting blockchain technology for this practical benefit, methods and systems disclosed herein generate independent forks of the blockchain that are accessible by different users based on permissions assigned to the user. For example, a user may be assigned read-and-write privileges on only one fork of the permissioned blockchain, where the fork contains all data the user needs to access. Accordingly, the methods and systems provide the efficiency, clarity and confidentiality of a centralized, real-time responsive repository for sensitive information.

In some aspects, methods and systems for controlling users' access to data available on blockchains are described herein, comprising: determining a first right for a first user to first data; determining a location in a permissioned blockchain comprising the first data, the location being a first fork of the permissioned blockchain; determining a first privilege required to access the first fork; determining that the first user corresponds to a first cryptographic address; and assigning the first privilege to the first cryptographic address.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
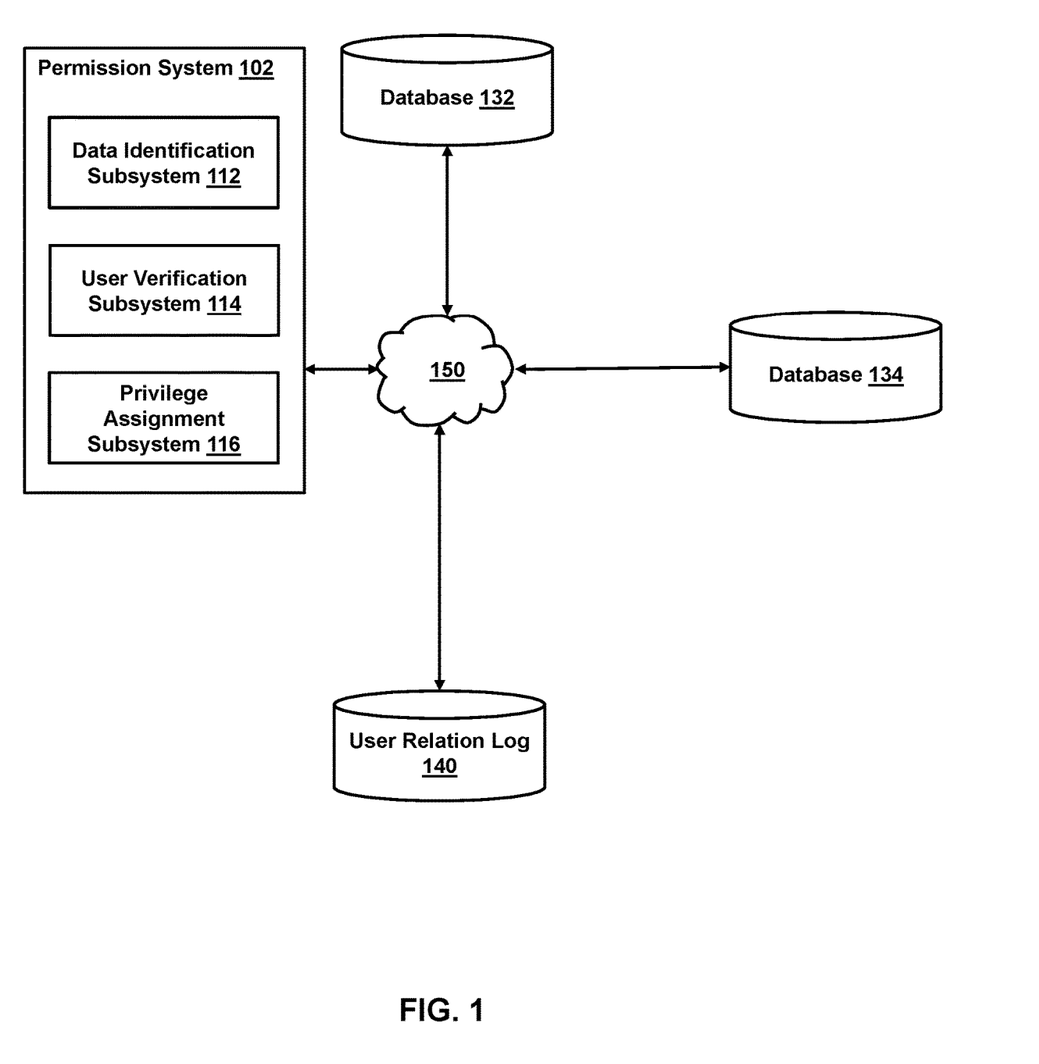
FIG. 1 shows an illustrative diagram for using computing systems to locate data and assign privileges as necessary, in accordance with one or more embodiments.

FIG. 1 shows an illustrative diagram for using computing systems to locate data and assign privileges as necessary, in accordance with one or more embodiments. For example, FIG. 1 shows permission system 102 for managing privilege levels for users on a permissioned blockchain. Permission system 102 includes Data Identification Subsystem 112, User Verification Subsystem 114, and Privilege Assignment Subsystem 116. As referred to herein, "the system" (e.g., system 150) may include all components of permission system 102, and may communicate with one or more data sources.

Data Identification Subsystem 112 may locate data within one or more blockchain blocks on the blockchain. In some embodiments, Data Identification Subsystem 112 may include a cryptographic address with read-and-write privilege on all forks of the permissioned blockchain. Otherwise, Data Identification Subsystem 112 may communicate with one or more blockchain components to identify a cryptographic address with read-and-write privilege on all forks of the permissioned blockchain.

As described herein, a "fork" may comprise a divergence in a blockchain that results in two potential paths forward. For example, a fork may comprise a change in a blockchain protocol and/or may occur when multiple blocks have the same block height in the change. In some embodiments, a fork may comprise a new distributed ledger with one or more blocks on the permissioned blockchain as a genesis block, or first block. A fork may occur as either a "hard" fork or a "soft" fork. A hard fork is a rule or protocol modification that results in software validating according to the old rules/protocols will mark blocks produced according to the new rules/protocol as invalid. In case of a hard fork, all nodes meant to work in accordance with the new rules will upgrade their software. With a hard fork, the blocks following the old rules/protocols and the blocks following the new rules/protocols are no longer inter-operable, resulting in two distinct chains. For example, if a permissioned blockchain presently has one fork, and a new block is added in a hard fork operation, there are now two distinct forks on the permissioned blockchain, each with independent privilege settings. The two forks possibly use different software and may have different protocols. For example, a first user may be able to read-and-write on the first fork, but have no privileges on the second fork. The first fork may contain a first dataset, and the second fork may contain a second dataset different from the first. The first user would not be able to access the second dataset.

A hard fork operation may be used when modifying downwards the privilege levels of one or more cryptographic addresses on the permissioned blockchain. A hard fork is effective for preventing access to historic data by an address no longer requiring such data. For example, a permissioned blockchain may hard fork into a first fork and a second fork; the first fork contains a first dataset. A user previously with read-and-write privileges on the first fork may have said privileges revoked, and their participation in the second fork will not grant them access to the first dataset. In addition, a hard fork is suitable for managing disparate datasets, where the data on a second fork makes no reference to the first fork. A soft fork comprises a fork in the blockchain that occurs when old network nodes do not follow a rule followed by the newly upgraded nodes. In such cases the newly generated fork and the preexisting fork are compatible. Blocks from the old fork may be accessed by cryptographic accounts on the new fork. A soft fork operation may be used, for example, when adjusting the privilege levels of one or more cryptographic addresses upwards. For example, a user may have read-and-write privileges on a first fork. The system would like to generate a new fork and give the user administrator privileges on the first and second forks. A soft fork could let the user maintain inter-operability between the first and second forks using the same cryptographic address.

The system may differentiate between the forks because the system may keep a record of all blocks on the permissioned blockchain, including each block's prior block. A fork is noted when two or more blocks have the same prior block. The system may record chain metadata associated with each fork, like the rules and protocols of that fork, the privilege settings of the fork, the chain height of the fork, the first block on the fork, and a list of all blocks on the fork. This chain metadata helps ensure that data transmitted to a given fork uses the correct rules/protocols and that users only undertake blockchain operations compliant with their privilege levels. The system may also use this chain metadata to differentiate between forks. For example, when Data Identification Subsystem 112 may identify a dataset in a block on the permissioned blockchain. To ascertain which fork the block is on, the system may retrieve chain metadata for one or more forks and parse the lists of all blocks on each fork to identify a fork containing the block with the dataset.

The system may keep track of privilege level settings for each fork of the permissioned blockchain in a data structure and verify blockchain operations in accordance with the privilege levels. The data structure may map each blockchain address to privilege levels on each fork of the permissioned blockchain, and may be accessible to the system off-chain. The system has full control over the contents of the data structure, and may make new entries or modify existing privilege levels of cryptographic addresses as necessary.

The system may store data in blocks on the permissioned blockchain as links to one or more data sources that are stored off-chain. The system may control access to the data sources using blockchain operations. For example, in response to a cryptographic address requesting to write content to one or more blocks, the system may choose to authorize or approve the request only in response to determining that the cryptographic address has read-or-write privileges or higher on a fork of the permissioned blockchain corresponding to the blocks. If the cryptographic address is deemed to have insufficient privileges, the system may not sign the blockchain operation allowing it to write to the blocks.

Data Identification Subsystem 112 may use such a cryptographic address to look through a fork of the permissioned blockchain in search of a particular target data. Within the fork of the permissioned blockchain are blocks, which contain data. Data Identification Subsystem 112 may retrieve the data within each block, and compare the data in the block with the target data. If an identical match is found between some or all the data within the block and the target data, Data Identification Subsystem 112 may identify the fork as the location of target data. When Data Identification Subsystem 112 has examined all the blocks in a fork and not found a match for the target data, it may examine a different fork in the permissioned blockchain until all forks have been examined.

Data Identification Subsystem 112 may also determine which data a user should have access to, for example at the time that a user is added to the permissioned blockchain. When Data Identification Subsystem 112 receives notification that a cryptographic address associated with a user is being added onto the permissioned blockchain, it may use User Relation Log 140 to determine a relation between an admin user and the user now being added. For example, a manufacturer may engage with a consulting firm, but only share some of its data currently on a permissioned blockchain. Data Identification Subsystem 112 may use User Relation Log 140 to identify the three particular datasets required by the consulting firm, for example. Data Identification Subsystem 112 may determine a required level of access for the consulting firm to the datasets. For example, the consulting firm may need to audit one of the datasets and modify the other two. If the first dataset is on a first fork of the permissioned blockchain, and the other two are on a second fork, Data Identification Subsystem 112 may determine that the consulting firm's cryptographic address need verification privileges on the first fork of the permissioned blockchain and read-and-write privileges on the second fork. Data Identification Subsystem 112 may continuously monitor User Relation Log to detect changes to relationships that may affect a user's access level to data. For example, the consulting firm may be staffed to another project that necessitates their control over a fourth dataset (e.g., Database 134 in FIG. 1). For example, the fourth dataset is in the consulting firm's ownership, and the system may decide to create a fourth fork on the permissioned blockchain to store the fourth dataset within a blockchain block. Data Identification Subsystem 112 may then communicate with Privilege Assignment Subsystem 116 to assign the consulting firm's cryptographic address administrator privileges on the fourth fork of the blockchain.

User Verification Subsystem 114 may verify the integrity of cryptographic operations and associate users with cryptographic addresses. The system may receive from devices associated with a user a verification request including a cryptographic signature. The user devices may contain a cryptography-based storage application, and cryptographic signatures may be generated using a private key of the cryptography-based storage application. For example, a function (e.g., Rivest-Shamir-Adleman (RSA) function) may be applied to a message (or the hash of a message) with the private key of the cryptography-based storage application belonging to the sender. A node of the blockchain may verify that the request is coming from the cryptography-based storage application by applying a function with the public key to the digital signature and comparing the result to the expected message (or the hash of the message). If the expected message and/or hash matches the result of applying the function, then the authentication system can verify that the request is coming from the cryptography-based storage application associated with the private and public keys. Thus, the system may ensure the cryptographic signature comes from the user that controls the cryptography-based storage application. Proof that the user controls the private key of the cryptographic address is proof that the cryptographic address should be assigned all the rights and privileges belonging to the user. Any suitable functions and/or alternative digital signature schemes may be used, such as Probabilistic Signature Scheme (PSS) and/or the like.

Privilege Assignment Subsystem 116 may change the privilege levels of cryptographic addresses on the permissioned blockchain. For example, at the time a cryptographic address is added to the permissioned blockchain, Privilege Assignment Subsystem 116 may receive a communication from Data Identification Subsystem 112 indicating the level of privilege the cryptographic address is to have on one or more forks of the blockchain. For example, Data Identification Subsystem 112 may indicate that the consulting firm's cryptographic address from the above example need verification privileges on the first fork of the permissioned blockchain and read-and-write privileges on the second fork. In some embodiments, the cryptographic address may contain a parameter or data field which expresses their level of access on a fork of the blockchain. Additionally or alternatively, a blockchain node of the permissioned blockchain may record the privileges of each cryptographic address on each fork of the blockchain. Privilege Assignment Subsystem 116 may assign privileges to the cryptographic address of the consulting firm by, for example, writing to the privilege data field of the cryptographic address alphanumeric strings symbolizing verification privileges on the first fork of the permissioned blockchain and read-and-write privileges on the second fork. Privilege Assignment Subsystem 116 may also instruct a blockchain node of the permissioned blockchain to record verification privileges given to the cryptographic address on the first fork of the permissioned blockchain and read-and-write privileges on the second fork.

At a subsequent time, Privilege Assignment Subsystem 116 may receive from Data Identification Subsystem 112 instructions to update the privilege levels of one or more cryptographic addresses. For example, the project that necessitated the consulting firm's access to the first dataset on the first fork of the permissioned blockchain may end. Privilege Assignment Subsystem 116 may revoke privileges of the cryptographic address of the consulting firm on the first fork by, for example, writing to the privilege data field of the cryptographic address a null value. Privilege Assignment Subsystem 116 may also instruct a blockchain node of the permissioned blockchain to record verification privileges removed from the cryptographic address on the first fork. The privileges of the cryptographic address on the second fork of the permissioned blockchain may remain unchanged since Privilege Assignment Subsystem 116 has not determined a need to revoke them.

Figure 2:
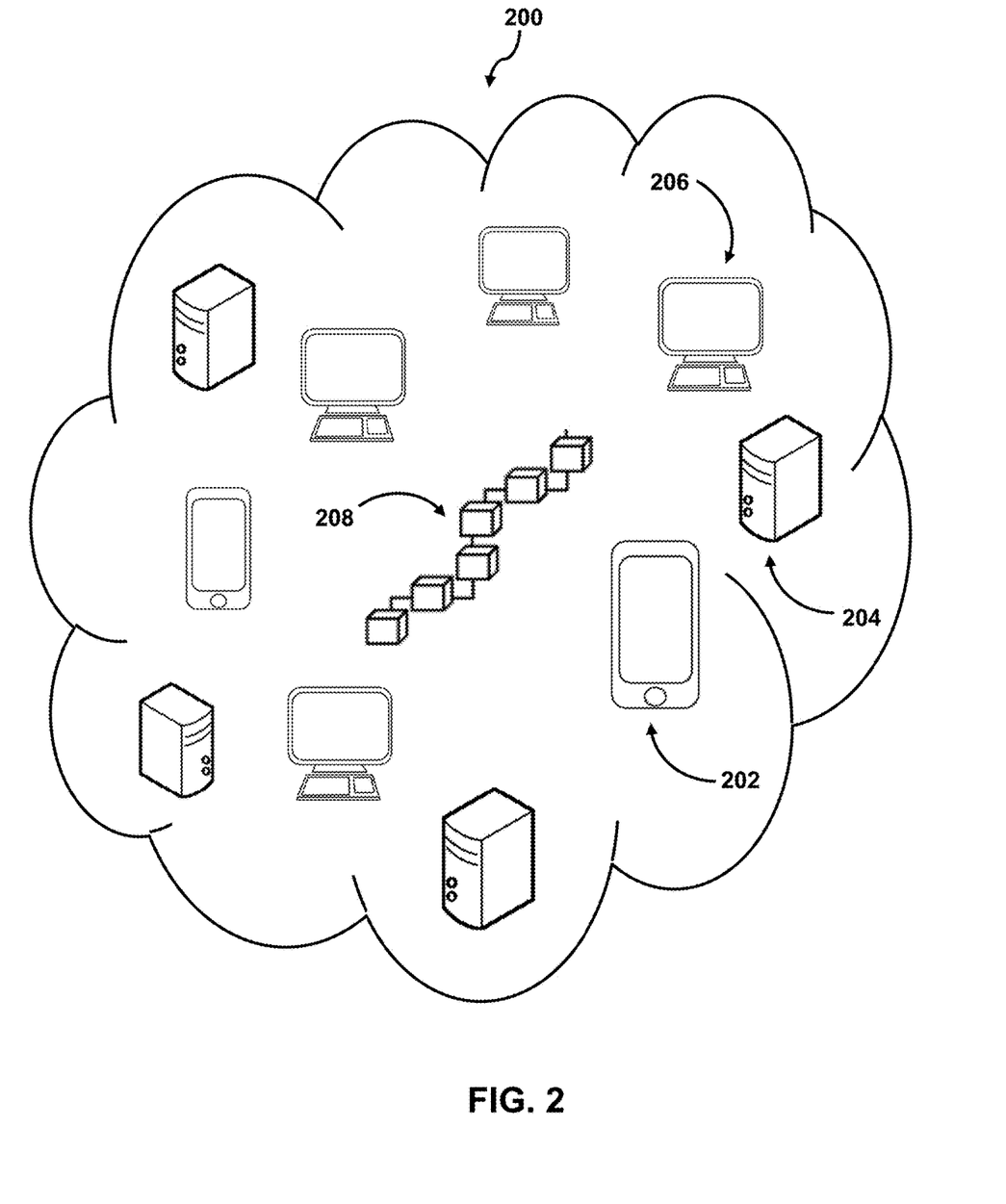
FIG. 2 shows an illustrative diagram for a blockchain and components it may communicate with to perform blockchain operations, in accordance with one or more embodiments.

FIG. 2 shows an illustrative diagram for communicating with a permissioned blockchain and performing blockchain operations, in accordance with one or more embodiments. For example, blockchain 208 may be a multi-fork permissioned blockchain. One or more components in this figure may store and/or modify privilege levels of different cryptographic addresses on one or more forks of the permissioned blockchain.

FIG. 2 shows an illustrative diagram for a decentralized environment for performing blockchain functions, in accordance with one or more embodiments. For example, the diagram presents various components that may be used to commit data to the permissioned blockchain, change privilege levels on forks of the permissioned blockchain, and/or verify users' associations with cryptographic addresses in some embodiments.

As shown in FIG. 2, system 200 may include multiple user devices (e.g., user device 202, user device 202, and/or user device 206). For example, system 200 may comprise a distributed state machine, in which each of the components in FIG. 2 acts as a client of system 200. For example, system 200 (as well as other systems described herein) may comprise a large data structure that holds not only all accounts and balances but also a state machine, which can change from block to block according to a predefined set of rules and which can execute arbitrary machine code. The specific rules of changing state from block to block may be maintained by a virtual machine (e.g., a computer file implemented on and/or accessible by a user device, which behaves like an actual computer) for the system. For example, system 200 may interact with, and facilitate the function of, blockchain 208.

It should be noted that, while shown as a smartphone, a personal computer, and a server in FIG. 2, the user devices may be any type of computing device, including, but not limited to, a laptop computer, a tablet computer, a hand-held computer, and/or other computing equipment (e.g., a server), including "smart," wireless, wearable, and/or mobile devices. It should be noted that embodiments describing system 200 performing a blockchain function may equally be applied to, and correspond to, an individual user device (e.g., user device 202, user device 204, and/or user device 206) performing the blockchain function. That is, system 200 may correspond to the user devices (e.g., user device 202, user device 204, and/or user device 206) collectively or individually.

Each of the user devices may be used by the system to conduct blockchain functions and/or contribute to assigning privileges to one or more cryptographic addresses. As referred to herein, "blockchain functions" may comprise any operations including and/or related to blockchains and blockchain technology. For example, blockchain functions may include conducting transactions, querying a distributed ledger, generating additional blocks for a blockchain, transmitting communications-related nonfungible tokens, performing encryption/decryption, exchanging public/private keys, and/or other operations related to blockchains and blockchain technology. In some embodiments, a blockchain function may comprise the creation, modification, detection, and/or execution of a smart contract or program stored on a blockchain. For example, a smart contract may comprise a program stored on a blockchain that is executed (e.g., automatically, without any intermediary's involvement or time loss) when one or more predetermined conditions are met. In some embodiments, a blockchain function may comprise the creation, modification, exchange, and/or review of a token (e.g., a digital blockchain-specific asset), including a nonfungible token. A nonfungible token may comprise a token that is associated with a good, a service, a smart contract, and/or other content that may be verified by, and stored using, blockchain technology.

In some embodiments, blockchain functions may also comprise actions related to mechanisms that facilitate other blockchain functions (e.g., actions related to metering activities for blockchain functions on a given blockchain network). For example, Ethereum, which is an open-source, globally decentralized computing infrastructure that executes smart contracts, uses a blockchain to synchronize and store the system's state changes. Ethereum uses a network-specific cryptocurrency called ether to meter and constrain execution resource costs. The metering mechanism is referred to as "gas." As the system executes a smart contract, the system accounts for every blockchain function (e.g., computation, data access, transaction, etc.). Each blockchain function has a predetermined cost in units of gas (e.g., as determined based on a predefined set of rules for the system). When a blockchain function triggers the execution of a smart contract, the blockchain function may include an amount of gas that sets the upper limit of what can be consumed in running the smart contract. The system may terminate execution of the smart contract if the amount of gas consumed by computation exceeds the gas available in the blockchain function. For example, in Ethereum, gas comprises a mechanism for allowing Turing-complete computation while limiting the resources that any smart contract and/or blockchain function may consume.

In some embodiments, gas may be obtained as part of a blockchain function (e.g., a purchase) using a network-specific cryptocurrency (e.g., ether in the case of Ethereum). The system may require gas (or the amount of the network-specific cryptocurrency corresponding to the required amount of gas) to be transmitted with the blockchain function as an earmark to the blockchain function. In some embodiments, gas that is earmarked for a blockchain function may be refunded back to the originator of the blockchain function if, after the computation is executed, an amount remains unused.

As shown in FIG. 2, one or more user devices (e.g., user device 204) may include a digital wallet used to perform blockchain functions. For example, the digital wallet may comprise a repository that allows users to store, manage, and trade their cryptocurrencies and assets, interact with blockchains, and/or conduct blockchain functions using one or more applications. The digital wallet may be specific to a given blockchain protocol or may provide access to multiple blockchain protocols. In some embodiments, the system may use various types of wallets such as hot wallets and cold wallets. Hot wallets are connected to the internet while cold wallets are not. Most digital wallet holders hold both a hot wallet and a cold wallet. Hot wallets are most often used to perform blockchain functions, while a cold wallet is generally used for managing a user account and may have no connection to the internet.

As shown in FIG. 2, one or more user devices may include a private key and/or digital signature. For example, system 200 may use cryptographic systems for conducting blockchain functions such as verifying the cryptographic addresses that correspond to users. For example, system 200 may use public-key cryptography, which features a pair of digital keys (e.g., which may comprise strings of data). In such cases, each pair comprises a public key (e.g., which may be public) and a private key (e.g., which may be kept private). System 200 may generate the key pairs using cryptographic algorithms (e.g., featuring one-way functions). System 200 may then encrypt a message (or other blockchain function) using an intended receiver's public key such that the encrypted message may be decrypted only with the receiver's corresponding private key. In some embodiments, system 200 may combine a message with a private key to create a digital signature on the message. For example, the digital signature may be used to verify the authenticity of blockchain functions. As an illustration, when conducting blockchain functions, system 200 may use the digital signature to prove to every node in the system that it is authorized to conduct the blockchain functions.

For example, system 200 may comprise a plurality of nodes for the blockchain network. Each node may correspond to a user device (e.g., user device 202). A node for a blockchain network may comprise an application or other software that records and/or monitors peer connections to other nodes and/or miners for the blockchain network. For example, a miner comprises a node in a blockchain network that facilitates blockchain functions by verifying blockchain functions on the blockchain, adding new blocks to the existing chain, and/or ensuring that these additions are accurate. The nodes may continually record the state of the blockchain and respond to remote procedure requests for information about the blockchain.

For example, user device 202 may request a blockchain function (e.g., conduct a transaction). The blockchain function may be authenticated by user device 204 and/or another node (e.g., a user device in the community network of system 200). For example, using cryptographic keys, system 200 may identify users and give access to their respective user accounts (e.g., corresponding digital wallets) within system 200. Using private keys (e.g., known only to the respective users) and public keys (e.g., known to the community network), system 200 may create digital signatures to authenticate the users.

Following an authentication of the blockchain function, the blockchain function may be authorized. For example, after the blockchain function is authenticated between the users, system 200 may authorize the blockchain function prior to adding it to the blockchain. System 200 may add the blockchain function to blockchain 208. System 200 may perform this based on a consensus of the user devices within system 200. For example, system 200 may rely on a majority (or other metric) of the nodes in the community network (e.g., user device 202, user device 204, and/or user device 206) to determine that the blockchain function is valid. In response to validation of the block, a node user device (e.g., user device 202, user device 204, and/or user device 206) in the community network (e.g., a miner) may receive a reward (e.g., in a given cryptocurrency) as an incentive for validating the block.

To validate the blockchain function, system 200 may use one or more validation protocols and/or validation (or consensus) mechanisms. For example, system 200 may use a POW mechanism in which a user device must provide evidence that it performed computational work to validate a blockchain function and thus this mechanism provides a manner for achieving consensus in a decentralized manner as well as preventing fraudulent validations. For example, the POW may involve iterations of a hashing algorithm. The user device that is successful aggregates and records blockchain functions from a mempool (e.g., a collection of all valid blockchain functions waiting to be confirmed by the blockchain network) into the next block. Alternatively or additionally, system 200 may use a POS mechanism in which a user account (e.g., corresponding to a node on the blockchain network) is required to have, or "stake," a predetermined amount of tokens in order for system 200 to recognize it as a validator in the blockchain network.

In response to validation of the block, the block is added to blockchain 208, and the blockchain function is completed. For example, to add the blockchain function to blockchain 208, the successful node (e.g., the successful miner) encapsulates the blockchain function in a new block before transmitting the block throughout system 200.

Figure 3:
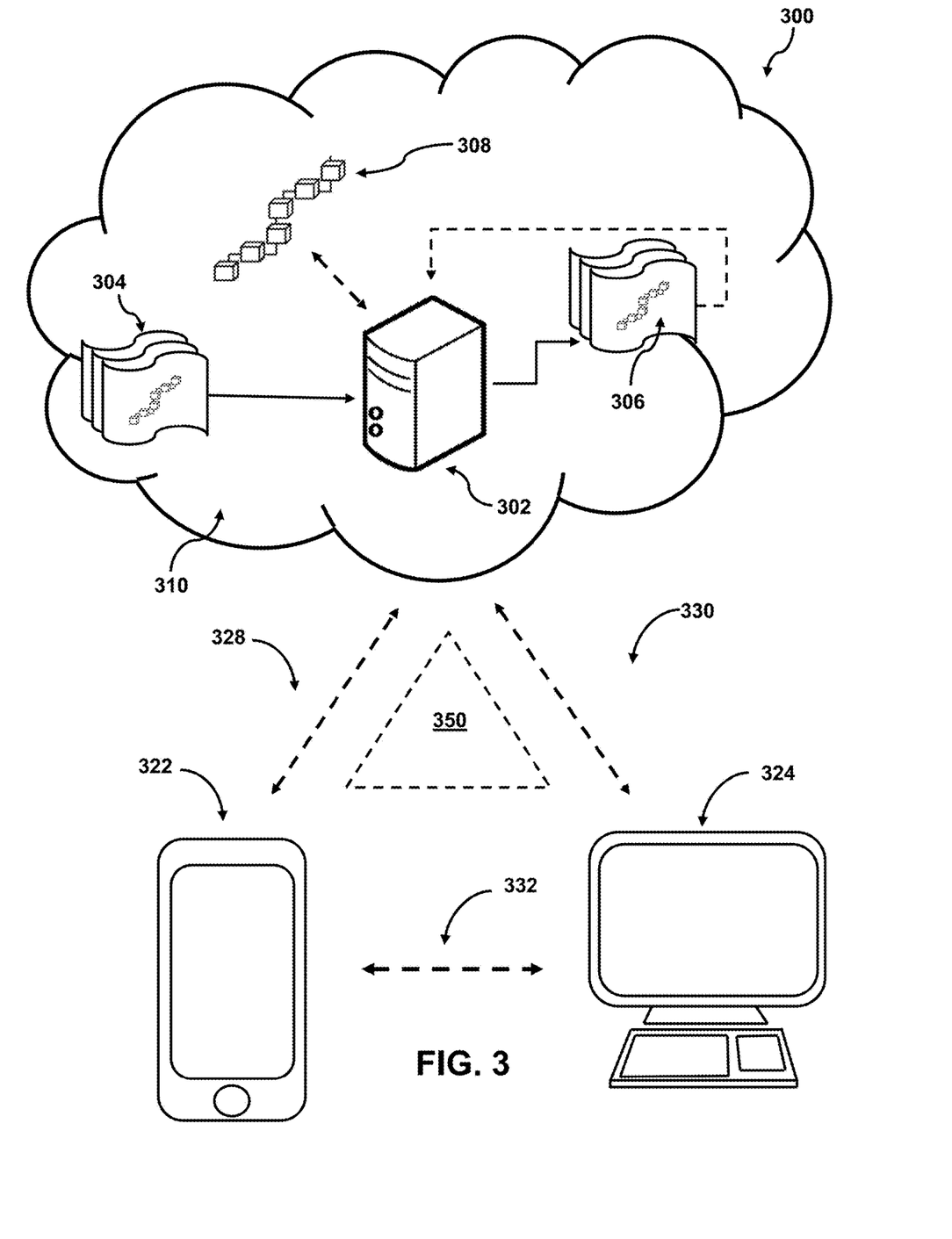
FIG. 3 shows illustrative components for a system used to communicate with devices and perform blockchain operations, in accordance with one or more embodiments.

FIG. 3 shows illustrative components for a system used to communicate to manage permission levels for all users, in accordance with one or more embodiments. For example, FIG. 3 may show illustrative components for communicating with user devices to receive data or to determine their appropriate privileges. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system, and may feature one or more component devices. It should also be noted that system 300 is not limited to three devices. Users may, for instance, utilize one or more devices to interact with one another, one or more servers, or other components of system 300. It should be noted, that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen smartphones, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include all of Permission System 102, including Data Identification subsystem 112, User Verification Subsystem 114, and Privilege Assignment Subsystem 116. Cloud components 310 may include or have access to User Relation Log 140. Cloud components 310 may access blockchain network 308 (e.g., which in some embodiments may correspond to blockchain 208 (FIG. 2)). Additionally, cloud components 310 may access data sources submitted by one or more users, like Database 132 and Database 134 from FIG. 1.

Cloud components 310 may include model 302, which may be a machine learning model, artificial intelligence model, deep learning model, etc. (which may be referred collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., a lowest level of classification necessary for a particular cryptographic address).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., which level of privilege should be assigned to a particular cryptographic address).

In some embodiments, the model (e.g., model 302) may automatically perform actions based on outputs 306. In some embodiments, the model (e.g., model 302) may not perform any actions. The output of the model (e.g., model 302) may be used to determine an appropriate level of privilege for a user's access to data).

System 300 also includes API layer 350. API layer 350 may allow the system to generate summaries across different devices. In some embodiments, API layer 350 may be implemented on mobile device 322 or user terminal 324. Alternatively or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web-services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDoS protection, and API layer 350 may use RESTful APIs as standard for external integration.

Figure 4:
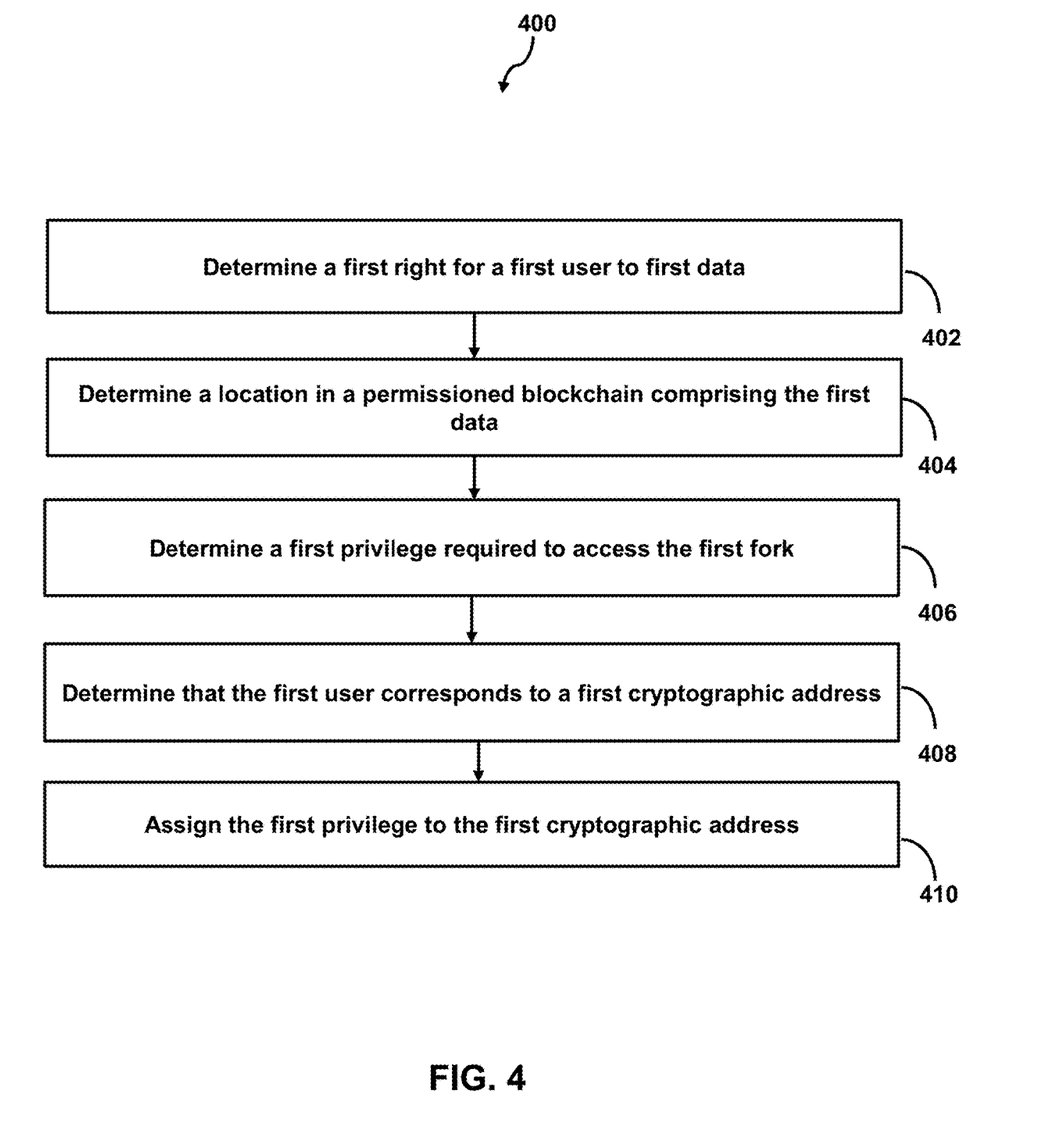
FIG. 4 shows a flowchart of the steps involved in determining a right of a user to data, locating the data, and assigning sufficient privileges to the user for access to the data, in accordance with one or more embodiments.

FIG. 4 shows a flowchart of the steps involved in determining the scope of a user's access to data, locating the data, and assigning privileges to the user sufficient to access the data, in accordance with one or more embodiments. For example, the system may use process 400 (e.g., as implemented on one or more system components described above) in order to establish a permission control system which protects the confidentiality, efficiency and clarity of a centralized, real-time responsive repository.

In one example embodiment, the system may receive from an original user a request to compartmentalize access to a first dataset (e.g., Database 132) for a plurality of other users in association with the original user. The system may, for example, cause generation of a private distributed ledger, or a permissioned blockchain like blockchain 208. The system may receive from the original user the first dataset and a cryptographic signature in connection with the request. The system may create a first blockchain block, the contents of which include the first dataset. The first blockchain block may be committed to a first fork the permissioned blockchain to be viewable by all on the first fork. The system may then send all cryptographic addresses on the first fork of the permissioned blockchain a real-time notification indicating that a first block has been committed to the first fork of the permissioned blockchain. By doing so, it keeps all participants of the first fork informed of the arrival of new data pertinent to them.

At step 402, process 400 (e.g., using one or more components described above) determines a first right for a first user to first data. For example, the system may be informed that the first user has been added as a participant in the permissioned blockchain. For example, the first user could be a recently-added business contact of an original user who possesses or controls some data on the permissioned blockchain. To determine the scope of the first user's access to the permissioned blockchain, the system may ascertain the relation of the first user to one or more existing users on the permissioned blockchain. For example, the system may identify an admin user that controls a cryptographic address with administrator privileges on the first fork of the permissioned blockchain. The system may retrieve a registry of user relations (e.g., User Relation Log 140) and use the registry of user relations to determine a relation between the admin user and the first user. For example, the first user may be a subcontractor for an original user—a banking corporation—who handles five particular cases. The system may determine the first data using the relation between the admin user and the first user. For example, the first user may need access to debtor databases and transitional histories pertaining to the five cases, which may be available on the first fork of the permissioned blockchain. By doing so, the system may clarify the purpose of the first user's access to the permissioned blockchain.

At step 404, process 400 (e.g., using one or more components described above) determines a location in a permissioned blockchain comprising the first data. For example, the system may determine that the first user needs access to the first fork of the permissioned blockchain. In doing so, the system may read data within the permissioned blockchain by retrieving a cryptographic address with read-and-write privileges or above on all forks of the permissioned blockchain to access each fork of the permissioned blockchain. The system may read the data within each blockchain block in each fork of the permissioned blockchain. In particular, the system may match the first data, which the system has determined the first user should access, to data within a blockchain block on the first fork of the permissioned blockchain. For example, the system may determine that debtor databases and transitional histories for two of the five cases that the first user handles reside in one or more blockchain blocks on the first fork of the blockchain. Thus, the system determines that the location comprising the first data is the first fork in the permissioned blockchain. In addition, the first user may have a second right to second data. For example, the first user from the example above may need to access debtor databases and transitional histories for the other three of the five cases that the first user handles. The system may determine that the second data is in a second fork of the permissioned blockchain. The system may again do this by retrieving a cryptographic address with read-and-write privileges or above on all forks of the permissioned blockchain to access each fork of the permissioned blockchain, read the data within each blockchain block in each fork of the permissioned blockchain, and match the second data to one or more blocks on the second fork. The system may subsequently assign a level of privilege to the first user on the second fork corresponding to their second right to second data. By doing so, the system may effectively limit the scope of access for users on the permissioned blockchain to only the forks that hold relevant information to each user.

At step 406, process 400 (e.g., using one or more components described above) determines a first privilege required to access the first fork. The system may identify an extent of access needed by the first user to the first data using the relation between the admin user and the first user. To continue the above example, because the first user is a subcontractor to the original user, the first user needs to be able to view changes to the data shared to them by the original user in a timely manner. In addition, if the situation for any of the five cases they handle has changed, the first user needs to be able to reflect the updated situation to the original user. Therefore, the system may determine that the first user needs to be able to view and update debtor databases and transitional histories for the five cases they handle with reference to user relation log 140.

The system may receive a second request to include an update to the first dataset in the first blockchain block, the second request being signed with a second cryptographic signature. For example, the first user may receive new data regarding the five cases they handle which needs to be reflected on the permissioned blockchain in addition to the first dataset. In response to verifying the second request using the second cryptographic signature, the system may create a second blockchain block which contains the first dataset and the update to the first dataset (e.g., Database 134) and commit the second blockchain block to the first fork of the permissioned blockchain. In some embodiments, a cryptographic address with read-or-write privileges or administrator privileges may commit the second blockchain block to the permissioned blockchain. The system may send all cryptographic addresses on the first fork of the permissioned blockchain a real-time notification indicating that a second block has been committed to the first fork of the permissioned blockchain. By doing so, the system keep make the users aware of relevant updates to data that they require.

At step 408, process 400 (e.g., using one or more components described above) determines that the first user corresponds to a first cryptographic address. The system may receive a cryptographic identification message from a source known to be associated with the first user (e.g., a device or server controlled by the user). The cryptographic identification message may be generated using a private key of a cryptography-based storage application corresponding to the first cryptographic address. For example, the cryptography-based storage application may use RSA encryption with a private key with which cryptographic operations can be signed, and a public key with which cryptographic signatures can be decrypted. The system may decrypt the cryptographic identification message to verify its validity as conferred by the private key. The system may do this with, for example, user verification subsystem 114 to determine that the cryptographic identification message was signed using the private key. By determining that a user device or server signed the cryptographic identification message, the system verifies that the user controls the private key of the cryptography-based storage application and therefore the cryptographic address.

At step 410, process 400 (e.g., using one or more components described above) assigns the first privilege to the first cryptographic address. In some embodiments, the first privilege could be administrator privileges, read-and-write privileges, or verification privileges. Administrator privileges on a fork of the permissioned blockchain permit a cryptographic address to set the privileges of all cryptographic addresses on the fork of the permissioned blockchain, read and write content to the fork of the permissioned blockchain, and sign blockchain operations on the fork of the permissioned blockchain. Read-and-write privileges on a fork of the permissioned blockchain permit a cryptographic address to read and write content to the fork of the permissioned blockchain and sign blockchain operations on the fork of the permissioned blockchain. For example, a cryptographic address with read-and-write privileges may commit blockchain blocks containing data to the fork of the permissioned blockchain, but may not modify the privilege levels of other cryptographic addresses. Verification privileges on a fork of the permissioned blockchain only permit a cryptographic address to sign blockchain operations on the fork of the permissioned blockchain. The system may, for example, assign to the first cryptographic address (e.g., corresponding to the subcontractor from above examples) read-and-write privileges on the first and second fork of the permissioned blockchain such that they may retrieve and modify required data. The system may assign a second cryptographic address (e.g., corresponding to the banking corporation from above examples) administrator privileges on all forks of the permissioned blockchain so that they may control access levels to their proprietary data as well as receive and review updates to data on the permissioned blockchain. The system may assign a third cryptographic address verification privileges on all forks of the permissioned blockchain. The third cryptographic address may correspond to a user who does not need to update the data within the permissioned blockchain, but who should be able to check the data and any updates to the data for correctness.

The system may modify the privilege level of users when their initially-assigned privileges are no longer appropriate. For example, an entertainment corporation may use a permissioned blockchain to manage confidential personal data. The entertainment corporation has retained a legal counsel for compliance, so the legal counsel's cryptographic address has verification privileges on a first fork of the permissioned blockchain. The duties of the legal counsel have now increased such that they require access to some of the personal data in the permissioned blockchain. For example, the system may determine that the legal counsel has a right to the first dataset which requires at least read-and-write privileges on the first fork. Consequently, the system may retrieve a cryptographic address on the first fork of the permissioned blockchain with administrator privileges, for example the cryptographic address of the entertainment corporation. The system may transmit a request to the cryptographic address (e.g., of the entertainment corporation) indicating that the privileges of the legal counsel's cryptographic address should be assigned to read-and-write. By doing so, the system may expand the access of parties to the permissionless blockchain as necessary.

The system may also remove privileges from a user when the situation warrants revocation of access. To continue the above example, suppose that the legal counsel's cryptographic address now has read-and-write privileges. However, the server or device which hosts the legal counsel's cryptographic address has been hacked. The system may determine that the legal counsel's system has been compromised, and initiate revocation of their cryptographic address's access to the permissioned blockchain. The system may retrieve a cryptographic address on the first fork of the permissioned blockchain with administrator privileges (e.g., the entertainment corporation's cryptographic address) and transmit a request to the cryptographic address indicating that the privileges of the legal counsel's cryptographic address should be revoked. In some embodiments, one or more programs corresponding to the entertainment corporation's cryptographic address may search through all forks of the permissioned blockchain and set the privilege of the legal counsel's cryptographic address to null. By doing so, the system may protect the integrity and confidentiality of data on the permissioned blockchain.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method, the method comprising determining a first right for a first user to first data; determining a location in a permissioned blockchain comprising the first data, wherein the location comprises a first fork of the permissioned blockchain; determining a first privilege required to access the first fork; determining that the first user corresponds to a first cryptographic address; and assigning the first privilege to the first cryptographic address.

2. The method of any one of the preceding embodiments, wherein determining the location in the permissioned blockchain comprising the first data comprises: retrieving a cryptographic address with read-and-write privileges or above on all forks of the permissioned blockchain; accessing each fork of the permissioned blockchain to read the data within each blockchain block in the fork of the permissioned blockchain; and matching the first data to data within a blockchain block on the first fork of the permissioned blockchain.

3. The method of any one of the preceding embodiments, wherein assigning the first privilege to the first cryptographic address comprises assigning to the first cryptographic address read-and-write privileges on the first fork of the permissioned blockchain, and wherein read-and-write privileges on a fork of the permissioned blockchain permit a cryptographic address to read and write content to the fork of the permissioned blockchain and sign blockchain operations on the fork of the permissioned blockchain.

4. The method of any one of the preceding embodiments, further comprising: assigning to a second cryptographic address administrator privileges on all forks of the permissioned blockchain, and wherein administrator privileges on a fork of the permissioned blockchain permit a cryptographic address to set the privileges of all cryptographic addresses on the fork of the permissioned blockchain, read and write content to the fork of the permissioned blockchain, and sign blockchain operations on the fork of the permissioned blockchain.

5. The method of any one of the preceding embodiments, further comprising: assigning to a third cryptographic address verification privileges on all forks of the permissioned blockchain, and wherein verification privileges on a fork of the permissioned blockchain permit a cryptographic address to sign blockchain operations on the fork of the permissioned blockchain.

6. The method of any one of the preceding embodiments, wherein determining the first right for the first user to the first data further comprises: identifying an admin user that controls a cryptographic address with administrator privileges on the first fork of the permissioned blockchain; retrieving a registry of user relations; using the registry of user relations to determine a relation between the admin user and the first user; and determining the first data using the relation between the admin user and the first user.

7. The method of any one of the preceding embodiments, wherein determining the first privilege required to access the first fork comprises: identifying an extent of access needed by the first user to the first data using the relation between the admin user and the first user; and determining a lowest level of privilege in a hierarchy of privileges on the first fork which satisfies the extent of access.

8. The method of any one of the preceding embodiments, wherein determining that the first user corresponds to the first cryptographic address comprises: receiving a cryptographic identification message from a source known to be associated with the first user, wherein the cryptographic identification message was generated using a private key of a cryptography-based storage application corresponding to the cryptographic address; and decrypting the cryptographic identification message to verify its validity as conferred by the private key.

9. The method of any one of the preceding embodiments, further comprising: receiving from the first user a first request to commit a first dataset to the first fork of the permissioned blockchain, the first request being signed with a first cryptographic signature; creating a first blockchain block which contains the first dataset; committing the first blockchain block to the first fork of the permissioned blockchain; and sending all cryptographic addresses on the first fork of the permissioned blockchain a real-time notification indicating that a first block has been committed to the first fork of the permissioned blockchain.

10. The method of any one of the preceding embodiments, further comprising: receiving from a second user a second request to include an update to the first dataset in the first blockchain block, the second request being signed with a second cryptographic signature; creating a second blockchain block which contains the first dataset and the update to the first dataset; committing the second blockchain block to the first fork of the permissioned blockchain; and sending all cryptographic addresses on the first fork of the permissioned blockchain a real-time notification indicating that a second block has been committed to the first fork of the permissioned blockchain.

11. The method of any one of the preceding embodiments, further comprising: detecting that a spectating user with only verification privileges has a right to the first dataset which requires at least read-and-write privileges on the first fork; retrieving a cryptographic address on the first fork of the permissioned blockchain with administrator privileges; and transmitting a request to the cryptographic address indicating that the privileges of the spectating user's cryptographic address should be assigned to read-and-write.

12. The method of any one of the preceding embodiments, further comprising: detecting that a full-access user with read-and-write privileges has been compromised; retrieving a cryptographic address on the first fork of the permissioned blockchain with administrator privileges; and transmitting a request to the cryptographic address indicating that the privileges of the full-access user's cryptographic address should be revoked.

13. The method of any one of the preceding embodiments, further comprising: determining a second right for the first user to second data; determining the second data is in a second fork of the permissioned blockchain; and assigning read-and-write privileges on the second fork of to the permissioned blockchain to the first cryptographic address.

14. A tangible, non-transitory, machine-readable medium storing instructions that, when executed by a data processing apparatus, cause the data processing apparatus to perform operations comprising those of any of embodiments 1-13.

15. A system comprising one or more processors; and memory storing instructions that, when executed by the processors, cause the processors to effectuate operations comprising those of any of embodiments 1-13.

16. A system comprising means for performing any of embodiments 1-13.

What is claimed is:

1. A system for controlling users access to data available on blockchains, the system comprising:
one or more processors; and
a non-transitory, computer readable medium comprising instructions that when executed by the one or more processors cause operations comprising:
   accessing a permissioned blockchain with one or more forks;
   determining that a first user corresponds to a first cryptographic address, a second user corresponds to a second cryptographic address, and a third user corresponds to a third cryptographic address, wherein a cryptographic address may perform one or more blockchain operations on the permissioned blockchain;
   determining privileges required to access the one or more forks;
   based on the privileges required to access the one or more forks:
      assigning, to the first cryptographic address, administrator privileges on all forks of the permissioned blockchain, wherein administrator privileges on a fork of the permissioned blockchain permit a cryptographic address to set the privileges of all cryptographic addresses on the fork of the permissioned blockchain, read and write content to the fork of the permissioned blockchain, and sign blockchain operations on the fork of the permissioned blockchain;
      assigning, to the second cryptographic address, read-and-write privileges on a first fork of the permissioned blockchain, wherein read-and-write privileges on a fork of the permissioned blockchain permit a cryptographic address to read and write content to the fork of the permissioned blockchain and sign blockchain operations on the fork of the permissioned blockchain; and
      assigning, to the third cryptographic address, verification privileges on the first fork of the permissioned blockchain, wherein verification privileges on a fork of the permissioned blockchain permit a cryptographic address to sign blockchain operations on the fork of the permissioned blockchain;
   receiving from the first user a first request to commit a first dataset to the first fork of the permissioned blockchain, the first request being signed with a first cryptographic signature;
   creating a first blockchain block which contains the first dataset;
   committing the first blockchain block to the first fork of the permissioned blockchain;
   receiving from the second user a second request to include an update to the first dataset in the first blockchain block, the second request being signed with a second cryptographic signature;
   creating a second blockchain block which contains the first dataset and the update to the first dataset;
   committing the second blockchain block to the first fork of the permissioned blockchain; and
   sending the first user, the second user, and the third user a real-time notification indicating that a second block has been committed to the first fork of the permissioned blockchain.

2. A method for controlling users' access to data available on blockchains, the method comprising:
   determining a first right for a first user to first data;
   determining a location in a permissioned blockchain comprising the first data, wherein the location comprises a first fork of the permissioned blockchain;
   determining a first privilege required to access the first fork;
   determining that the first user corresponds to a first cryptographic address; and
   assigning the first privilege to the first cryptographic address, wherein assigning the first privilege to the first cryptographic address comprises assigning read-and-write privileges to the first cryptographic address to permit the first cryptographic address to (i) read content on the first fork of the permissioned blockchain, (ii) write content to the first fork of the permissioned blockchain, (iii) and sign blockchain operations on the first fork of the permissioned blockchain.

3. The method of claim 2, wherein determining the location in the permissioned blockchain comprising the first data comprises:
   retrieving a cryptographic address with the read-and-write privileges or above on all forks of the permissioned blockchain;
   accessing each fork of the permissioned blockchain to read the data within each blockchain block in the fork of the permissioned blockchain; and
   matching the first data to data within a blockchain block on the first fork of the permissioned blockchain.

4. The method of claim 2, further comprising:
   assigning, to a second cryptographic address, administrator privileges on all forks of the permissioned blockchain, wherein administrator privileges on a fork of the permissioned blockchain permit a cryptographic address to (a) set privileges of all cryptographic addresses on the fork of the permissioned blockchain, (b) read content on the fork of the permissioned blockchain, (c) write content to the fork of the permissioned blockchain, and (iv) sign blockchain operations on the fork of the permissioned blockchain.

5. The method of claim 2, further comprising:
   assigning, to a third cryptographic address, verification privileges on all forks of the permissioned blockchain, wherein verification privileges on a fork of the permissioned blockchain permit a cryptographic address to sign blockchain operations on the fork of the permissioned blockchain.

6. The method of claim 2, wherein determining the first right for the first user to the first data further comprises:
   identifying an admin user that controls a cryptographic address with administrator privileges on the first fork of the permissioned blockchain;
   retrieving a registry of user relations;

using the registry of user relations to determine a relation between the admin user and the first user; and determining the first data using the relation between the admin user and the first user.

7. The method of claim 6, wherein determining the first privilege required to access the first fork comprises:

identifying an extent of access needed by the first user to the first data using the relation between the admin user and the first user; and determining a lowest level of privilege in a hierarchy of privileges on the first fork which satisfies the extent of access.

8. The method of claim 2, wherein determining that the first user corresponds to the first cryptographic address comprises:

receiving a cryptographic identification message from a source known to be associated with the first user, wherein the cryptographic identification message was generated using a private key of a cryptography-based storage application corresponding to the first cryptographic address; and decrypting the cryptographic identification message to verify its validity as conferred by the private key.

9. The method of claim 2, further comprising:

receiving, from the first user, a first request to commit a first dataset to the first fork of the permissioned blockchain, the first request being signed with a first cryptographic signature;

creating a first blockchain block which contains the first dataset;

committing the first blockchain block to the first fork of the permissioned blockchain; and sending all cryptographic addresses on the first fork of the permissioned blockchain a real-time notification indicating that a first block has been committed to the first fork of the permissioned blockchain.

10. The method of claim 9, further comprising:

receiving, from a second user, a second request to include an update to the first dataset in the first blockchain block, the second request being signed with a second cryptographic signature;

creating a second blockchain block which contains the first dataset and the update to the first dataset;

committing the second blockchain block to the first fork of the permissioned blockchain; and sending all cryptographic addresses on the first fork of the permissioned blockchain a real-time notification indicating that a second block has been committed to the first fork of the permissioned blockchain.

11. The method of claim 9, further comprising:

detecting that a spectating user with only verification privileges has a right to the first dataset which requires at least read-and-write privileges on the first fork;

retrieving a cryptographic address on the first fork of the permissioned blockchain with administrator privileges; and transmitting a request to the cryptographic address indicating that privileges of the spectating user's cryptographic address should be assigned to read-and-write.

12. The method of claim 2, further comprising:

detecting that a full-access user with the read-and-write privileges has been compromised;

retrieving a cryptographic address on the first fork of the permissioned blockchain with administrator privileges; and transmitting a request to the cryptographic address indicating that privileges of the full-access user's cryptographic address should be revoked.

13. The method of claim 2, further comprising:

determining a second right for the first user to second data;

determining the second data is in a second fork of the permissioned blockchain; and assigning the read-and-write privileges on the second fork of the permissioned blockchain to the first cryptographic address.

14. One or more non-transitory computer-readable media storing instructions that, when executed by one or more processors, cause the one or more processors to perform operations comprising:

determining a first right for a first user to first data;

determining a location in a permissioned blockchain comprising the first data, wherein the location comprises a first fork of the permissioned blockchain;

determining a first privilege required to access the first fork;

determining that the first user corresponds to a first cryptographic address; and assigning the first privilege to the first cryptographic address, wherein assigning the first privilege to the first cryptographic address comprises assigning read-and-write privileges to the first cryptographic address to permit the first cryptographic address to (i) read content on the first fork of the permissioned blockchain, (ii) write content to the first fork of the permissioned blockchain, (iii) and sign blockchain operations on the first fork of the permissioned blockchain.

15. The one or more non-transitory computer-readable media of claim 14, wherein the instructions further cause the one or more processors to perform operations comprising:

identifying an admin user that controls a cryptographic address with administrator privileges on the first fork of the permissioned blockchain;

retrieving a registry of user relations;

using the registry of user relations to determine a relation between the admin user and the first user; and determine the first data using the relation between the admin user and the first user.

16. The one or more non-transitory computer-readable media of claim 14, wherein determining that the first user corresponds to the first cryptographic address comprises:

receiving a cryptographic identification message from a source known to be associated with the first user, wherein the cryptographic identification message was generated using a private key of a cryptography-based storage application corresponding to the first cryptographic address; and decrypting the cryptographic identification message to verify its validity as conferred by the private key.

17. The one or more non-transitory computer-readable media of claim 15, wherein the instructions further cause the one or more processors to perform operations comprising:

receiving, from the first user, a first request to commit a first dataset to the first fork of the permissioned blockchain, the first request being signed with a first cryptographic signature;

creating a first blockchain block which contains the first dataset;

committing the first blockchain block to the first fork of the permissioned blockchain; and sending all cryptographic addresses on the first fork of the permissioned blockchain a real-time notification indicating that a first block has been committed to the first fork of the permissioned blockchain.

18. The one or more non-transitory computer-readable media of claim 17, wherein the instructions further cause the one or more processors to perform operations comprising:
   receiving, from a second user, a second request to include an update to the first dataset in the first blockchain block, the second request being signed with a second cryptographic signature;
   creating a second blockchain block which contains the first dataset and the update to the first dataset;
   committing the second blockchain block to the first fork of the permissioned blockchain; and
   sending all cryptographic addresses on the first fork of the permissioned blockchain a real-time notification indicating that a second block has been committed to the first fork of the permissioned blockchain.

19. The one or more non-transitory computer-readable media of claim 17, wherein the instructions further cause the one or more processors to perform operations comprising:
   detecting that a spectating user with only verification privileges has a right to the first dataset which requires at least read-and-write privileges on the first fork;
   retrieving a cryptographic address on the first fork of the permissioned blockchain with administrator privileges; and
   transmitting a request to the cryptographic address indicating that privileges of the spectating user's cryptographic address should be assigned to read-and-write.

* * * * *